United States Patent
Ujii et al.

(10) Patent No.: US 8,570,162 B2
(45) Date of Patent: Oct. 29, 2013

(54) INPUT APPARATUS

(75) Inventors: Junichi Ujii, Tokyo (JP); Megumi Kuwabara, Tokyo (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/392,866

(22) PCT Filed: Aug. 26, 2010

(86) PCT No.: PCT/JP2010/005266
§ 371 (c)(1),
(2), (4) Date: Apr. 9, 2012

(87) PCT Pub. No.: WO2011/024457
PCT Pub. Date: Mar. 3, 2011

(65) Prior Publication Data
US 2012/0188066 A1    Jul. 26, 2012

(30) Foreign Application Priority Data

Aug. 27, 2009   (JP) .................................. 2009-196282

(51) Int. Cl.
*G08B 6/00*    (2006.01)
*G06F 3/041*    (2006.01)

(52) U.S. Cl.
USPC ..................... 340/407.2; 340/540; 178/18.01; 345/173; 345/175; 345/168

(58) Field of Classification Search
USPC ......... 340/540, 665, 407.2; 178/18.01, 19.04; 345/168, 173, 174, 175
See application file for complete search history.

(56) References Cited

U.S. PATENT DOCUMENTS

| 6,831,631 | B2 * | 12/2004 | Chuang | 345/173 |
| 6,940,494 | B2 * | 9/2005 | Hoshino et al. | 345/173 |
| 7,417,625 | B2 * | 8/2008 | Morris | 345/169 |
| 2011/0102326 | A1 * | 5/2011 | Casparian et al. | 345/168 |

FOREIGN PATENT DOCUMENTS

| JP | 2005-352927 A | 12/2005 |
| JP | 2006-039745 A | 2/2006 |
| JP | 2006-134609 A | 5/2006 |
| JP | 2007-093967 A | 4/2007 |
| JP | 2007-305007 A | 11/2007 |
| JP | 2011-48607 A | 3/2011 |

OTHER PUBLICATIONS

International Search Report; PCT/JP2010/005266; Nov. 30, 2010.
Written Opinion of the International Searching Authority; PCT/JP2010/005266; Nov. 30, 2010.
The Japanese Office Action "Notification of Reason for Refusal" dated Jan. 29, 2013, which corresponds to Japanese Patent Application No. 2012-040658, and is related to U.S. Appl. No. 13/392,866 with translation.

* cited by examiner

Primary Examiner — Benjamin C Lee
Assistant Examiner — Rajsheed Black-Childress
(74) Attorney, Agent, or Firm — Studebaker & Brackett PC

(57) ABSTRACT

An input apparatus capable of receiving inputs of a plurality of levels in accordance with pressed area varied in each operation by an operator is provided. An input apparatus 10 configured to receive the inputs of a plurality of levels in accordance with the pressed area has a area detection unit 40 configured to detect a pressed area of a pressing input and a control unit 20 configured to control to set a second standard area for receiving a second level input every time the area detection unit 40 detects the pressed area satisfying a first standard area for receiving a first level input.

10 Claims, 8 Drawing Sheets

FIG. 2
(A)
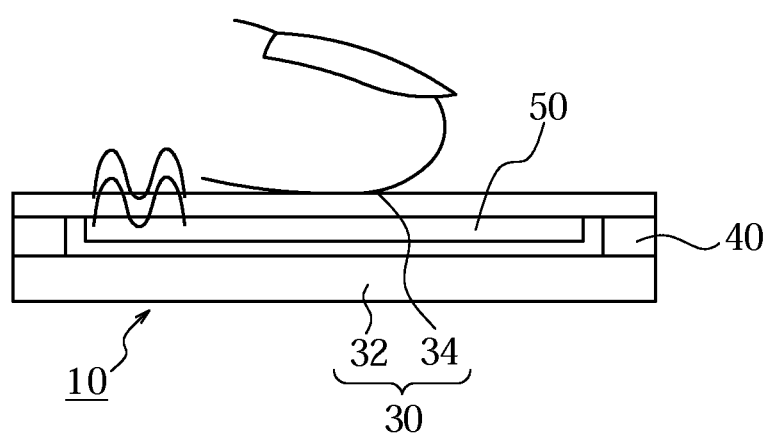
(B)
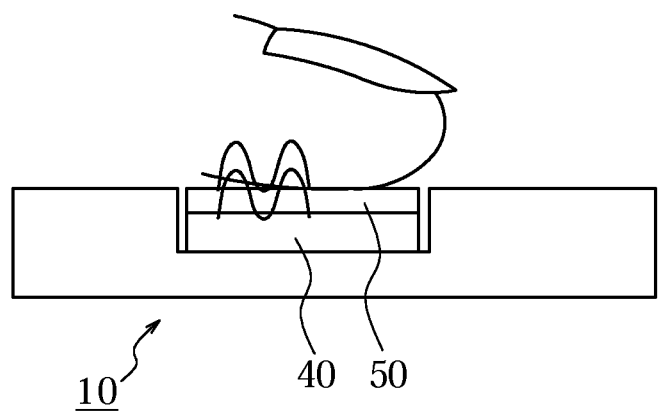

FIG. 4
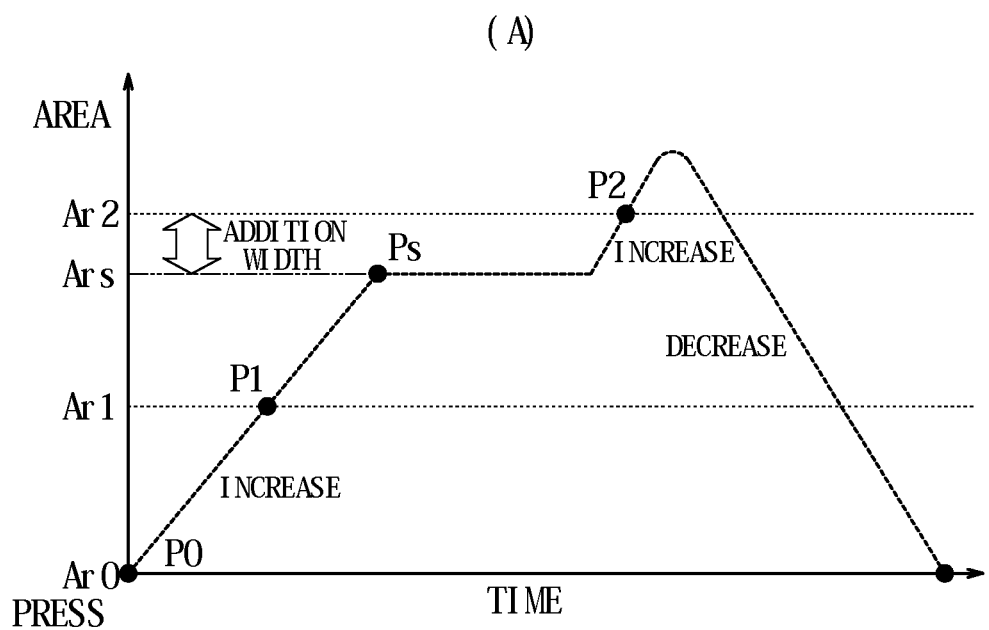
(A)
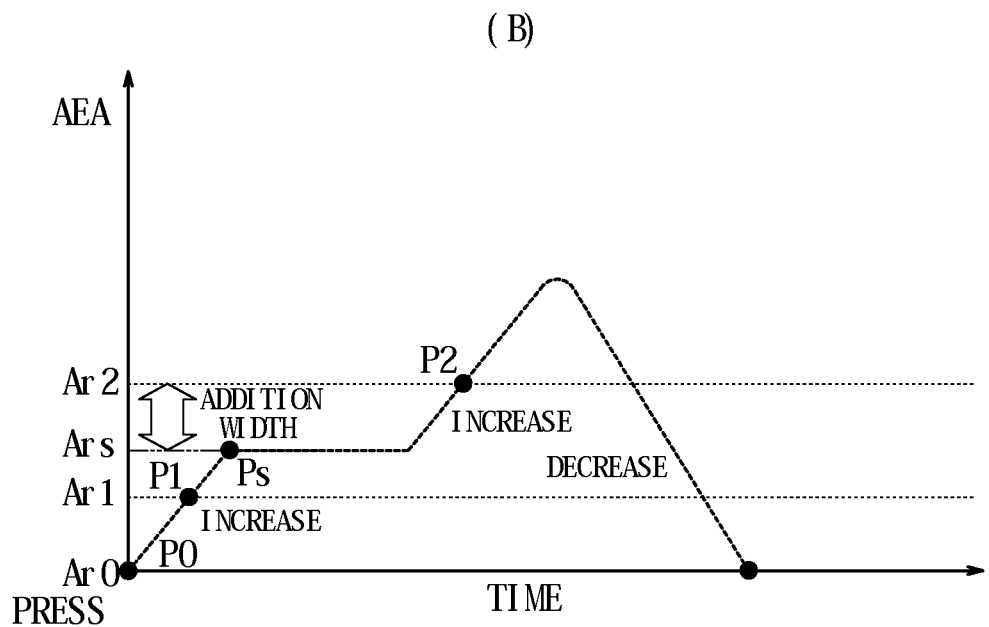
(B)

FIG. 5
(A)
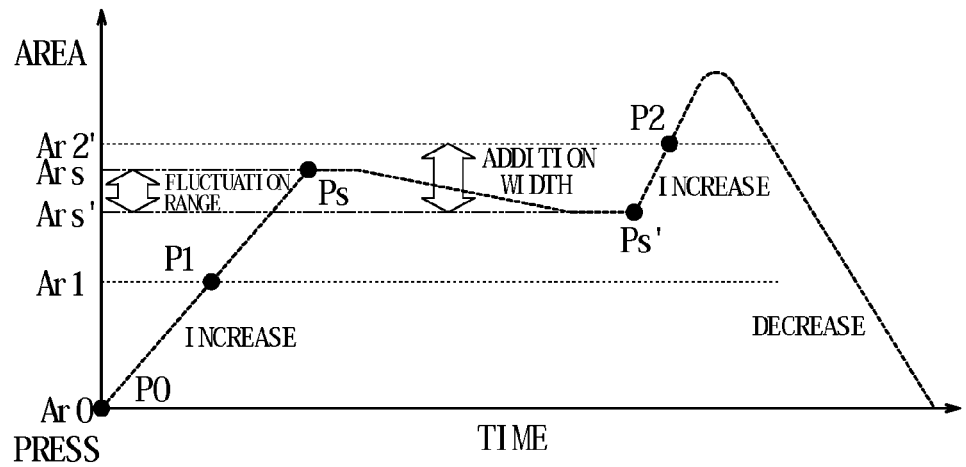
(B)
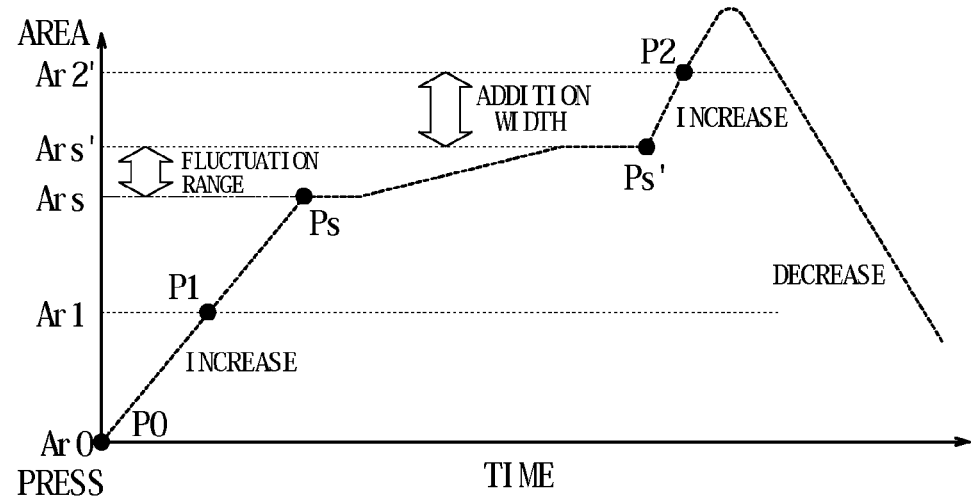

INPUT APPARATUS

CROSS REFERENCE TO RELATED APPLICATION

This application claims priority to and the benefit of Japanese Patent Application No. 2009-196282 (filed on Aug. 27, 2009), the entire contents of which are incorporated herein by reference.

TECHNICAL FIELD

The present invention relates to an input apparatus, and more particularly, to an input apparatus configured to receive inputs at multiple steps in accordance with pressed area.

BACKGROUND ART

Conventionally, for a variety of electronic devices including mobile phones, gaming machines and digital cameras, a mechanical switch, such as a tact switch or a membrane switch, is used in general as an input apparatus allowing an operator to perform input operations. These days, small terminal devices are often equipped with various functions, and such terminal devices have keys and buttons constituted by various switches on a body surface thereof.

In general, such a switch is assigned one operation (or one program). For example, the mobile phone outputs a number corresponding to the key upon detection of a pressing input to a numerical keypad and displays a menu panel upon detection of the pressing input to a menu key.

However, if an operator carries out a plurality of operations in series with each of different switches assigned respective operations, it may result in a substantially troublesome task. It may be considered to set such that a plurality of operations are sequentially carried out with a single switch every time an input to the switch is detected, such an input method requires predefinition of an order of the operations. Therefore, an operation of immediate execution of arbitrary operations desired by the operator is not enabled.

In order to address such a problem described above, there has been suggested an input apparatus with a plurality of operations assigned to an input mode to one switch (for example, see Patent Document 1).

The input apparatus described in Patent Document 1 can receive inputs at two levels in accordance with operation force (a pressure load) applied by the input operation.

FIG. 8 is a cross-sectional view schematically illustrating an internal configuration of an operation apparatus 100 described in Patent Document 1. As illustrated in FIG. 8, the operation apparatus 100 has a first detection means 200 and a second detection means 300, both of which are constituted by the membrane switch. The second detection means 300 is arranged under (in a pressing direction) the first detection means 200. A portion to be in direct contact with a finger F of the operator is made of a flexible member, which bends when the operator presses the operation apparatus 100 and thereby conveys the pressure to the first detection means 200. When the operator presses down a position corresponding to a first contact point S3 applying a light weight (first operation force) with the finger F, a first upper conductive portion 201c and a first lower conductive portion 202c come into contact with each other, and thereby the first contact point S3 is conducted. This is defined as a first level input. Further, when the finger F presses down applying a heavier weight (second operation force), a second upper conductive portion 301c and a second lower conductive portion 302c come into contact with each other, and thereby a second contact point T3 is conducted. This is defined as a second level input. FIG. 8 illustrates a state that not only the first contact point S3 detects the first level input but also the second contact point T3 detects the second level input as the operator's finger F presses the operation apparatus 100 applies the second operation force.

Since the input apparatus described above receives inputs at two levels in accordance with the pressure of the operator's input, different operation may be assigned to each of the levels. With such an input apparatus, the operator can separately carry out a plurality of inputs by adjusting a pressure of one pressing input to one switch (input apparatus).

That is, the input apparatus for receiving inputs at two levels enables the operator to carry out the first level input by maintaining light pressure on the button. This input state is called "halfway pressing", and referred to as the "first level input" hereinafter. This input apparatus also enables the operator to carry out the second level input by pressing the button with pressure heavier than that of the first level input. This input state is called "full pressing", and referred to as the "second level input" hereinafter.

As an example of typical usages of the input apparatus for receiving the inputs at two levels in accordance with the pressure by such a mechanical switch, there is a shutter button of a camera. In general, for the mobile phones and the like having a digital camera function, the "halfway pressing" for the first level input by the operator turns on functions for adjusting AE (Auto Exposure) or for adjusting AF (Auto Focus). If the operator carries out the "full pressing" for the second level input in this state, the shutter is released. As described above, it is possible to assign different operations to the first level input and the second level input and, in addition, the operator can separately operate the different operations as desired.

It is to be noted that the input apparatus for receiving inputs of a plurality of levels in accordance with the pressure is not limited to the mechanical switch. For example, there is suggested an input apparatus of a touch panel type, composed of a combination of a display unit and a position input device, for receiving inputs of a plurality of levels in accordance with the pressure by software processing (for example, see Patent Document 2).

The input apparatus of the touch panel type described in Patent Document 2 has a position detection means for detecting a position of a pressing operation on the touch panel provided on a surface portion of a displayed screen and a pressure detection means for detecting a pressure applied on the touch panel. This input apparatus enables inputs of two systems in one pressing operation to the touch panel: an input in accordance with a position detected by the position detection means and multi-level inputs in accordance with the pressure detected by the pressure detection means.

This input apparatus allows the operator to simultaneously carry out an input of a first system in accordance with a position of the pressing operation and an input of a second system in accordance with a pressure on the touch panel, in pressing operation to the touch panel on the displayed screen. At this time, selection is enabled on multiple levels, i.e., three or more levels, in accordance with the pressure on the touch panel. Accordingly, the operator can carry out the input of the two systems in one pressing operation to the touch panel, which enables reduction in the number of pressing operations.

As stated above, both of the input apparatus using the mechanical switch and the input apparatus using the touch panel can receive inputs of a plurality of levels in accordance with the pressure. Since those input apparatuses receive the input classifying into a plurality of levels in accordance with the pressure, a plurality of functions are collected to one button or key. Thereby, it is possible to reduce the number of keys and buttons serving for input operations. Especially for small terminals such as the mobile terminals, there is a difficulty in arranging numerous keys and buttons on their bodies due to their housings in small sizes. Accordingly, if the mobile terminal can separately perform a plurality of functions with a small number of keys and buttons, the number of keys and buttons to be provided on the terminal body is advantageously reduced.

RELATED ART DOCUMENTS

Patent Documents

Patent Document 1: Japanese Patent Laid-Open No. 2006-134609
Patent Document 2: Japanese Patent Laid-Open No. 2006-039745

SUMMARY OF INVENTION

Technical Problem

For the operation apparatus 100 described in Patent Document 1, however, specifications such as an arrangement of each of the membrane switch of the first detection means 200 and the membrane switch of the second detection means 300 are predefined at a time of designing or manufacture. Also, flexibility of the member constituting the membrane switch is also determined at the time of manufacture of products. Therefore, it is generally difficult to change such specifications afterward.

Accordingly, in using such an input apparatus, the operator needs to learn, through actual input operations, how heavy the pressure needs to be so as to be received as the first level input or as the second level input. That is, each operator needs to adjust his/her pressure to predetermined pressure for by the input apparatus.

Typically, detailed works and delicate pressure adjustments at fingertip vary between individual operators who are good at them and who are not. Accordingly, an input operation which may be performed by operators with light-fingered without difficulty does not necessarily mean that it may be immediately dealt by all ordinary operators.

Therefore, despite an intention to perform the first level input alone to the input apparatus, some operators may inadvertently press the button or the key applying excessive pressure at once, as being incapable of making a fine adjustment, resulting in unintentionally performing the second level input. Since a level of the pressure is invisible, it is difficult for the operators to know exactly how heavy the pressure needs to be such that the input at each level is accepted.

The same circumstance applies to the above Patent Document 2, too. The input apparatus of the touch panel type described in Patent Document 2 requires to be preset with a threshold of the pressure to be received by the pressure detection means in order to separately receive inputs of a plurality of levels in accordance with the pressure. Therefore, each operator must adjust his/her pressure to the predetermined pressure required by the input apparatus. As a result, it still leaves the problem unsolved that, despite the intention to perform the first level input alone, some operators may inadvertently apply excessive pressure, as incapable of making a fine adjustment, thus resulting in performing the second level input against the intention.

The input apparatus of the touch panel type described in the Patent Document 2 does not use the mechanical switch, but a control unit may perform a control in a software-like manner based on the pressure received by the pressure detection means. Accordingly, it is considered that the threshold for the pressure detection means to receive the pressure may be changed afterward by changing a setting by the control unit.

However, it is a significantly cumbersome task to reset the threshold for the pressure detection means to receive the pressure for each operator every time the operators change. Or, even for the same operator, the pressure of the input operation usually varies in each operation. As a result, the problem is still left unsolved, such that, despite the intention to perform the first level input alone, the operators may inadvertently apply so much pressure to the input apparatus that the second level input is performed unintentionally.

For example, in a case that the input apparatus described above is applied to a release button of a camera, when the operator does not appropriately adjust the pressure and thus the second level input is received at once beyond the first level input, a shutter is released before AE function and AF function appropriately operate. In this case, since the AE function and the AF function do not appropriately operate, there is a concern that an unfocused image is possibly taken. Also, in case of performing process to adjust some amount and the like is based on the pressure detected by the input apparatus or performing leveled processes assigned in accordance with the pressure, reception of the second level input at once may cause a disadvantage to perform an operation unintended by the operator.

As described above, when the threshold to receive the input at each level is fixed, there may be a problem that an unintentional input is performed against the operators' intention. When an unintentional input is performed against the operators' intention, the input apparatus operates following proper procedure for such an input operation, which is nothing but an erroneous operation for the operator.

Accordingly, it is an object of the present invention, in consideration of the above circumstances, to provide an input apparatus capable of receiving inputs of a plurality of levels in accordance with the pressed area based on the pressure that varies in each operation by the operator.

Solution to Problem

In order to achieve the above object, the invention according to claim 1 is an input apparatus configured to receive inputs at a plurality of levels in accordance with pressed area, including:
an area detection unit configured to detect the pressed area of a pressing input; and
a control unit configured to set, when the area detection unit detects a pressed area satisfying a first standard area for receiving a first level input, a second standard dimension for receiving a second level input.

The invention according to claim 2 is the input apparatus according to claim 1, wherein
the control unit sets the second standard area for receiving the second level input based on the pressed area detected by the area detection unit after the first standard area is satisfied.

The invention according to claim 3 is the input apparatus according to claim 1 or 2,
further including an area change rate calculation unit configured to calculate a temporal change rate of the pressed area detected by the area detection unit, wherein
the control unit sets the second standard area based on the pressed area at the point when the change rate of the pressed area decreases to a predetermined value or lower for the first time after the area detection unit detects the pressed area satisfying the first standard area.

The invention according to claim 4 is the input apparatus according to claim 1 or 2, further including an area change rate calculation unit configured to calculate an average change rate of the pressed area between detection of the pressed area and detection of the pressed area satisfying the first standard area by the area detection unit, as well as to calculate the temporal change rate of the pressed area detected by the area detection unit, wherein the control unit sets the second standard area based on the pressed area at a point when the change rate of the pressed area in a predetermined period after detection of the pressed area satisfying the first standard area by the area detection unit decreases to be lower than the average change rate by a predetermined amount or more.

The invention according to claim 5 is the input apparatus according to claim 1 or 2, further including an area change rate calculation unit configured to, at predetermined intervals, calculate the temporal change rate of the pressed area detected by the area detection unit, wherein the control unit sets the second standard area based on the pressed area at a point when the change rate of the pressed area in a first predetermined period after detection of the pressed area satisfying the first standard area by the area detection unit decreases to be lower by a predetermined value or more than the change rate of the pressed area in a second predetermined period immediately prior to the first predetermined period.

The invention according to claim 6 is the input apparatus according to claim 1 or 2, further including an area change rate calculation unit configured to calculate the temporal change rate of the pressed area detected by the area detection unit, wherein the control unit sets the second standard area based on the pressed area at a point when the change rate of the pressed area after detection of the pressed area satisfying the first standard area by the area detection unit, after decreasing to a first predetermined value or lower, increases to a second predetermined value or higher.

The invention according to claim 7 is the input apparatus according to claim 1 or 2, further including an area change rate calculation unit configured to calculate the average change rate of the pressed area between detection of the pressed area and detection of the pressed area satisfying the first standard area by the area detection unit, as well as to calculate the temporal change rate of the pressed area detected by the area detection unit, wherein the control unit sets the second standard area based on the pressed area at a point when the change rate of the pressed area in a predetermined period after detection of the pressed area satisfying the first standard area by the area detection unit, after decreasing to a first predetermined value or lower, increases to be different from the average change rate by a second predetermined value or less.

The invention according to claim 8 is the input apparatus according to claim 1 or 2, further including an area change rate calculation unit configured to, at predetermined intervals, calculate the temporal change rate of the pressed area detected by the area detection unit, wherein the control unit sets the second standard area based on the pressed area at a point when the change rate of the pressed area in a first predetermined period after detection of the pressed area satisfying the first standard area by the area detection unit increases, after decreasing down to a first predetermined value or lower, to a second predetermined value or more in comparison to the change rate of the pressed area in a second predetermined period immediately prior to the first predetermined period.

The invention according to claim 9 is the input apparatus according to any one of claims 1 to 8, further including an alert generation unit configured to generate alert by using at least one of sound, vibration and display, wherein the control unit controls the alert generation unit to generate the alert when the pressed area detected by the area detection unit satisfies the first standard area.

The invention according to claim 10 is an input method using an input apparatus configured to receive inputs at a plurality of levels in accordance with pressed area, including:

an area detection step for detecting the pressed area of a pressing input; and a step for controlling to set, when the pressed area satisfying a first standard area for receiving a first level input is detected at the area detection step, a second standard area for receiving a second level input.

Effect of the Invention

According to the input apparatus of the present invention, the second standard dimension for receiving the second level input is set every time the dimension detection unit detects the pushed dimension satisfying the first standard dimension for receiving the first level input. That is, the input apparatus according to the present invention sets a standard value of the dimension for receiving the second level input every time the operator performs an operation. Accordingly, the present invention enables to receive inputs of a plurality of levels in accordance with the pressed area that vary in each operation by the operator. It thereby solves a problem that the operator, despite his/her intention to carry out the first level input alone, inadvertently carries out the second level input at once by pressing an excessive pushed dimension on the input apparatus.

BRIEF DESCRIPTION OF DRAWINGS

FIG. 2 illustrates diagrams illustrating an exemplary housing structure of each function unit constituting the input apparatus according to the first embodiment;

FIG. 4 illustrates graphs representing changes in a pressed area detected by an area detection unit of the input apparatus according to the first embodiment;

FIG. 5 illustrates graphs representing changes in the pressed area detected by the area detection unit of the input apparatus according to a fourth embodiment;

DESCRIPTION OF EMBODIMENTS

Embodiments of the present invention will be described with reference to the accompanying drawings. In each of the following embodiments, the input apparatus according to the present invention is exemplified by a mobile terminal having a touch panel, such as a mobile phone, a PDA and the like. However, the input apparatus according to the present invention is not limited to those mobile terminals but may be a terminal having the input apparatus, such as a digital camera, a portable audio player, a notebook computer, a mini laptop and a gaming machine, for example. Also, the input apparatus according to the present invention is not necessarily limited to the mobile terminal but may be any terminal with the input apparatus, such as an ATM machine and a ticket machine at a train station. Further, the input apparatus according to the present invention is not limited to terminals having the touch panels, as described below. The present invention is applicable to any input apparatus having the touch panel or switches such as push buttons (or keys) for receiving an input operation by an operator and a function to detect a pressed area on the switch.

(First Embodiment)

Figure 1:
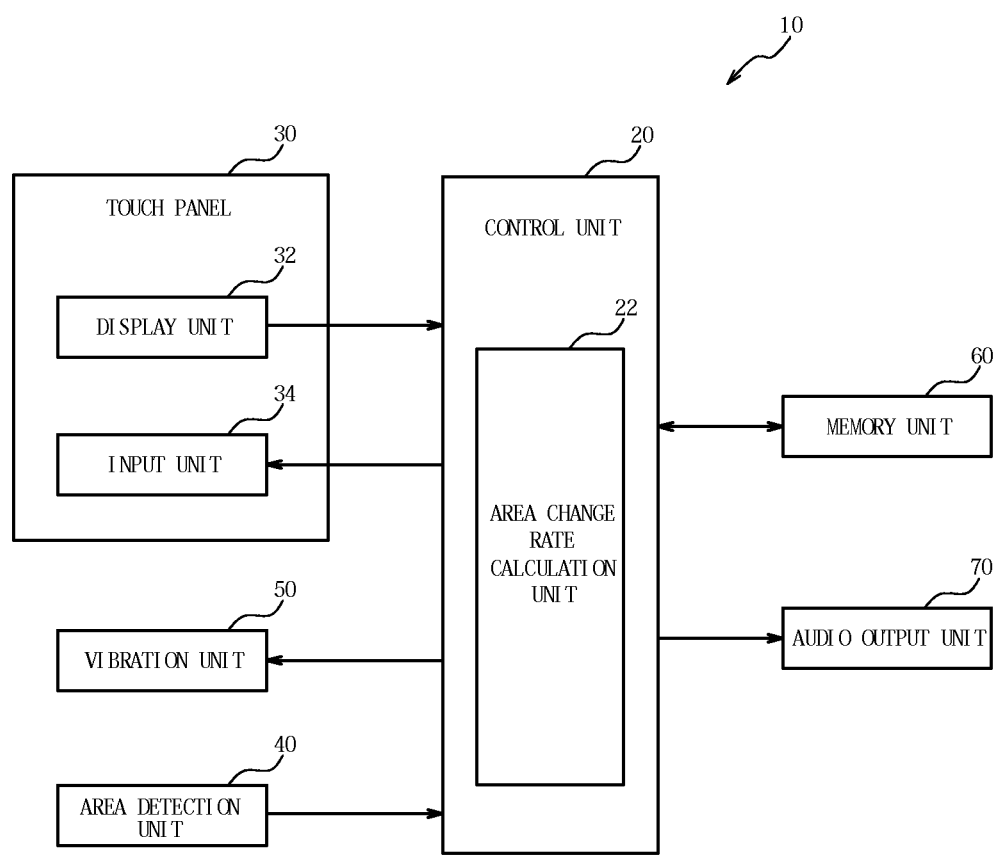
FIG. 1 is a functional block diagram schematically illustrating an internal configuration of an input apparatus according to a first embodiment.

FIG. 1 is a functional block diagram schematically illustrating an internal configuration of an input apparatus 10 according to the present embodiment. As shown in FIG. 1, the input apparatus 10 has a control unit 20, a touch panel 30, an area detection unit 40, a vibration unit 50, a memory unit 60 and an audio output unit 70.

The control unit 20 controls and manages the entire mobile terminal 10 including each functional block thereof. The control unit 20 has an area change rate calculation unit 22 configured to calculate a temporal variation of the pressed area detected by the area detection unit 40 using arithmetic processing.

According to the present embodiment, the touch panel 30 has a display unit 32 and an input unit 34. The touch panel 30 is constituted by disposing the input unit 34, which is configured to receive an input by the operator, on the front side of the display unit 32 in an overlapping manner.

The display unit 32 of the touch panel 30 may be, for example, a liquid crystal display (LCD) or an organic EL display. The display unit 32, in addition to a display according to each application, displays a graphical image of a user interface constituted by various keys and buttons in a predetermined display area for receiving input operations to the input unit 34 by the operator. Such graphical images of various keys and buttons displayed on the display unit 32 for receiving the input operation to the input unit 34 of the touch panel 30 by the operator, enabling the operator to visually confirm the input operation, is simply referred to as an "object", hereinafter. When being used as the user interface of the touch panel 30, the display unit 32 displays objects associated with operations, such as the keys, push buttons or a slide lever.

The input unit 34 constituted by a matrix switch or the like for receiving an input by the operator with a finger, a stylus pen and the like is disposed on the front surface of the display unit 32. By detecting (receiving) the input by a contact (pressure) of the operator's fingertip or the like, the input unit 34 outputs a signal corresponding to a position where the input by the contact (pressure) is detected. Thereby, the touch panel 30 may receive the input operation by the operator and display a variety of information, such as a result of the input, based on each application. When the input unit 34 detects the input by the contact (pressure), it is not necessary for the finger or the stylus pen to physically contact (push) the input unit 34. For example, when the input unit 34 is of an optical type, the input unit 34 detects a position where an infrared ray on the input unit 34 is blocked by the finger or the stylus pen. Therefore, it is not necessary for the finger or the stylus pen to contact (push) the input unit 34.

The area detection unit 40 has a matrix switch, for example, and detects the pressed area on the touch panel 30 (or the input unit 34). The area detection unit 40 detects the pressed area of a pressing input by the operator in input operation. For example, when the operator carries out the pressing input with the finger, a dimension of the touch panel 30 (or the input unit 34) contacted by the finger is detected as the pressed area. It is not always necessary for the area detection unit 40 to detect an accurate value of the pressed area. All that required is to be able to detect a temporal change in the pressed area. For example, it is necessary for the matrix switch to be able to detect increase in the pressed area by detecting input points sequentially, such that one point and then two points followed by three points are detected from inside to outside in a circular shape. When the input unit 34 is of the optical type, the area detection unit 40 may detect an area of the pressed area by detecting the area where the infrared ray on the input unit 34 is blocked by the finger or the stylus pen.

According to the present application, as described above, a dimension where the finger or the stylus pen used in the pressing input by the operator contact the touch panel 30 (or the input unit 34) is referred to as the "pressed area".

When the input unit 34 and the area detection unit 40 are constituted by using the matrix switch, the matrix switch may be used as both the input unit 34 and the area detection unit 40.

The vibration unit 50 is constituted by using, for example, a piezoelectric element or an ultrasonic transducer, for conveying vibration to the touch panel 30 (or the input unit 34). The vibration unit 50 may convey vibration thereof to the operator's finger or the like pressing the input unit 34. Through the vibration, it is possible to notify the operator that a predetermined input is normally received, upon input to the touch panel 30. That is, the vibration unit 50 serves as the alert generation unit according to the present embodiment. Predetermined information (for example, a vibration signal or the like) such as vibration generated by the vibration unit 50 serving as the alert generation unit and capable of being notified to the user is referred to as an "alert", hereinafter.

The memory unit 60 stores various applications and input information, as well as serving as a work memory. In the present embodiment, the memory unit 60 temporarily stores, for example, the pressed area of the pressing input by the operator detected by the area detection unit 40 and the temporal change rate of the pressed area calculated by the area change rate calculation unit 22 to be used by the control unit 20 for operations.

Thereby, setting tiered thresholds set for the pressed area detected by the area detection unit 40 enables the input apparatus 10 to receive inputs of a plurality of levels in accordance with the pressed area of the input operations by the operator.

The audio output unit 70 may be a buzzer or a speaker and, under control of the control unit 20, generates audible sound for the operator. That is, the audio output unit 70 may convey audio information to the operator pressing the input unit 34 by outputting predetermined sound. The sound output from the audio output unit 70 may be used in place of, or together with, vibration as the alert generated by the vibration unit 50. Generating sound as well as vibration, the input apparatus 10 may more assuredly notify the operator that the predetermined input is normally received, upon predetermined input to the touch panel 30 by the operator.

FIG. 2(A) illustrates an exemplary housing structure of the touch panel 30, the area detection unit 40 and the vibration unit 50 of the input apparatus 10 illustrated in FIG. 1. FIG. 2(A) is a cross-sectional view of a main section of the input unit 10.

FIG. 2(A) illustrates a state that, in pressing the graphical image of an object such as a button displayed on the display unit 32, the operator is pressing the input unit 34 at a position corresponding to the object displayed on the display unit 32 with the finger. The input unit 34 detects the position of the pressing input by detecting the pressure of the input by the operator's finger. The area detection unit 40 detects the area of a contact surface of the input unit 34 and the finger of the operator pressing the input unit 34. Therefore, the area detection unit 40 is disposed on the rear face of the input unit 34 so as to convey the pressed area by the pressure on the input unit 34. The vibration unit 50 provides the operator's finger with vibration on a timely basis based on the pressed area detected by the area detection unit 40. To that end, the vibration unit 50 is disposed in contact with the input unit 34, for example, to be able to convey vibration to the input unit 34. Vibration generated by the vibration unit 50 is controlled by the control unit 20 based on the pressed area detected by the area detection unit 40. This control by the control unit 20 will be described below.

Note that the input apparatus according to the present embodiment is not limited to those with the touch panel, as described above. FIG. 2(B) illustrates an exemplary housing structure of the input apparatus 10 according to the present embodiment constructed without the touch panel. FIG. 2(B) is a cross-sectional view of a main part of the input apparatus 10 having no touch panel.

As illustrated in FIG. 2(B), the input apparatus 10 does not have the display unit 32, as it does not use the touch panel. In order to display information such as a result of an input, the input apparatus 10 may have a separate display unit. With the input unit 10 illustrated in FIG. 2(B), accordingly, the operator carries out the pressing input by pressing actual buttons or keys instead of carrying out the pressing input (pressure input) to the object displayed on the display unit. In such a configuration without the input unit 34, the area detection unit 40 may serve as the input unit 34 as well. In this case, that is, an input to the input unit 34 is considered to be ON when the area detection unit 40 detects the pressed area, whereas an input to the input unit 34 is considered to be OFF when the area detection unit 40 does not detect the pressed area.

In the example illustrated in FIG. 2(B), the area detection unit 40 is disposed inside a concave portion of a housing (base member) of the input apparatus 10, and the vibration unit 50 is disposed on the area detection unit 40. Thus, an upper surface of the vibration unit 50 may directly receive the pressing input by the operator, and the area detection unit 40 detects the pressed area of the pressing input received by the vibration unit 50. Based on the pressed area detected by the area detection unit 40, the vibration unit 50 directly provides the operator's finger with vibration on a timely basis. In this case, the upper surface of the vibration unit 50 serves in a similar manner as the buttons or the keys. Therefore, the vibration unit 50 for receiving the pressing input by the operator may be in the form of a key top of the button, and indicates the function or the like of the button by clearly describing the function thereof on the key top.

Note that the input apparatus 10 having no touch panel is not limited to the construction as illustrated in FIG. 2(B).

According to the present embodiment, function units corresponding to an input to the input unit 10 may include, at least, the area detection unit 40 configured to detect the pressed area of the pressing input by the operator, and the vibration unit 50 serving as the alert generation unit configured to generate vibration as the alert for the operator. Therefore, it is possible to configure the function unit corresponding to the input to the input apparatus according to the present invention by adding the area detection unit 40 and the vibration unit 50 to a conventional mechanical switch, or by using a conventional switch having those functions.

Figure 3:
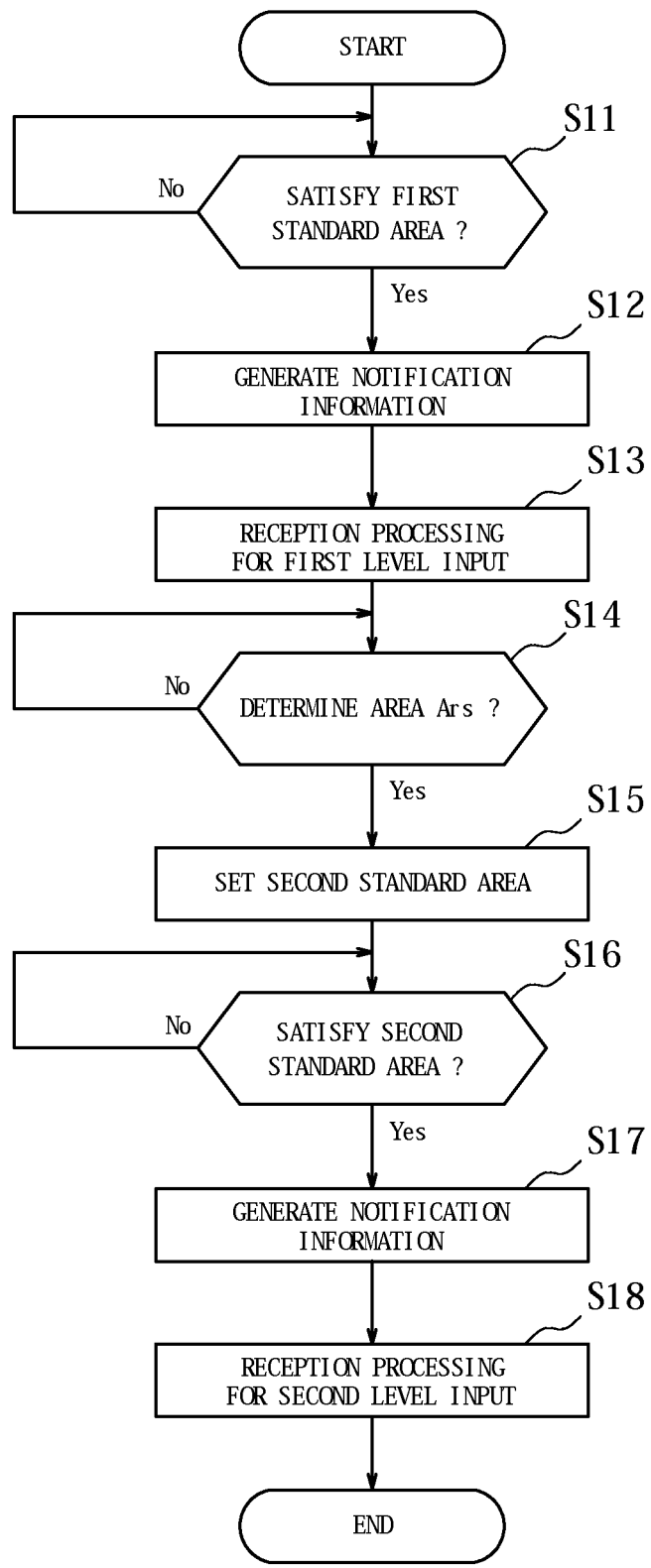
FIG. 3 is a flowchart illustrating an input reception operation by the input apparatus according to the first embodiment.

Next, an input reception operation by the input apparatus 10 according to the present embodiment will be described. FIG. 3 is a flowchart illustrating the input reception operation by the input apparatus 10 according to the present embodiment. According to the present embodiment, it is assumed that, in performing the input reception operation with the input apparatus 10, the operator of the input apparatus 10 knows that the input apparatus 10 receives inputs of at least two levels in accordance with the pressed area.

At the input apparatus 10, the control unit 20 monitors whether the area detection unit 40 has detected the pressed area, resulting from the pressing input to the input unit 34 by the operator. The input reception operation by the input apparatus 10 starts when the area detection unit 40 detects the pressed area. When the input apparatus 10 starts the input reception operation, the control unit 20 determines whether the area detection unit 40 has detected a pressed area satisfying a first standard area for receiving a first level input as the pressed area of the pressing input by the operator increases (step S11).

The first standard area for receiving the first level input is a predetermined threshold as a standard of the pressed area. When the area detection unit 40 detects a pressed area exceeding the threshold, the control unit 20 determines that the first level input defined by the input apparatus 10 is received and performs an operation accordingly. Although the first standard area for receiving the first level input is the predetermined pressed area as a threshold, it may be changed afterward as desired by the operator.

When a pressed area satisfying the first standard area for receiving the first level input is not detected at step S11, the input apparatus 10 turns into a waiting state. On the other hand, when a pressed area satisfying the first standard area for receiving the first level input is detected at step S11, the control unit 20 controls the alert generation unit to generate the alert (step S12). According to the present embodiment, that is, the control unit 20 controls the vibration unit 50 to vibrate in a predetermined manner. When the vibration unit 50 generates vibration, the control unit 20 retrieves information indicative of waveform or the like prestored in the memory unit 60 and controls the mode of the vibration generated by the vibration unit 50. In this manner, the operator, upon generation of the vibration, may recognize that the first level input is normally received by the input apparatus 10.

In addition to this operation, the control unit 20 also operates such that an operation corresponding to the first level input defined by the input apparatus 10 is performed in response to the reception of the first level input (step S13). If the input apparatus 10 is applied to a shutter button of a camera, for example, the operation at step S13 corresponds to an operation of "halfway pressing" of the input apparatus 10, that is, an operation to turn on functions for adjusting AE and AF.

FIG. 4 illustrates graphs representing changes in the pressed area of the pressing input by the operator detected by the area detection unit 40. An X-axis direction represents an elapse, whereas a Y-axis represents the pressed area detected by the area detection unit 40. In FIG. 4(A), a point P0 represents a point when the operator contacts the input unit 34 of the touch panel 30, whereas a point Ar0 represents a pressed area at that time. FIG. 4(A) illustrates a state that the pressed area detected by the area detection unit 40 is gradually increased as the operator increases the pressure of the input and, at a point P1, the pressed area reaches a first standard area Ar1 predetermined for receiving the first level input.

At this time, recognizing through generation of the vibration that the first level input is normally received, the operator maintains the pressure of the input (that is, the operator suppresses increasing the pressure), in an attempt to prevent performing a second level input at once. Here, the operator may recognize that the first level input is normally received, as the vibration is generated. However, the pressure for maintaining the pressure of the input, applied by the operator after recognizing the reception of the first level input, varies significantly between the operators.

For example, in the graph of the pressed area illustrate in FIG. 4(A), the operator does not reduce the pressure soon after the point P1, at which the pressed area reaches the Ar1, but instead increases the pressure and then maintains (not increasing) the pressure at a point Ps. For operators who usually press the buttons hard, it is assumed that they maintain the pressing input applying a relatively large force, despite an intention to maintain the pressure immediately after generation of vibration by the vibration unit 50 upon reception of the first level input.

On the other hand, as illustrated in the graph of the pressed area in FIG. 4(B), the operator suppresses increasing the pressure relatively soon after the point P1, at which the pressed area reaches the Ar1, and then maintains the pressure at the point Ps. For operators who usually press the buttons lightly, it is assumed that they maintain the pressure immediately after generation of vibration by the vibration unit 50 upon reception of the first level input.

Comparing between a pressed area Ars at the point Ps illustrated in FIG. 4(A) and a pressed area Ars at the point Ps illustrated in FIG. 4(B), it is illustrated that the latter one is much smaller than the former. It is thus illustrated that the pressure of the input applied by the operator to maintain it after recognizing the reception of the first level input varies widely between the operators. It is also assumed that, even by the same operator, the pressure to maintain the first level input varies in each operation.

According to the present embodiment, therefore, a second standard area Ar2 for receiving a second level input is set based on the pressed area Ars at the point Ps at which the operator maintains the pressure of the input after recognizing the reception of the first level input. That is, every time the area detection unit 40 detects a pressed area satisfying the first standard area Ar1 for receiving the first level input, the control unit 20 sets the second standard area Ar2 for receiving the second level input based on the pressed area Ars detected by the area detection unit 40 after the first standard area is satisfied. At this time, the second standard area Ar2 for receiving the second level input is larger than the first standard area Ar1 for receiving the first level input.

In order to operate as described above, the control unit 20 determines the pressed area Ars at the point Ps at which the operator maintains the pressure of the input (step S14). According to the present embodiment, the area change rate calculation unit 22 calculates the temporal change rate of the pressed area detected by the area detection unit 40. Then, at step S14 after the area detection unit 40 detects the pressed area satisfying the first standard area, the control unit 20 determines the pressed area, at a point when the change rate of the pressed area calculated by the area change rate calculation unit 22 decreases down to a predetermined value or lower for the first time, as the pressed area Ars. Accordingly, after the area detection unit 40 detects the pressed area Ar1 satisfying the first standard area, the control unit 20 sets the second standard area Ar1 based on the pressed area Ars when the change rate of the pressed area calculated by the area change rate calculation unit 22 decreases down to the predetermined value or lower for the first time.

Here, the "predetermined value" serving as an index for the change rate of the pressed area in decreasing is preferably a small value close to zero, for example, such that the point Ps may be identified, at which the operator suppresses increasing the pressure of an input and maintains it. Gradients of tangents of curved lines illustrated in FIG. 4 indicate the temporal change rate of the pressed area detected by the area detection unit 40. According to the present embodiment, therefore, the pressed area Ars is determined by adopting the pressed area at the point Ps when, after the point P1 in FIG. 4 at which the area detection unit 40 detects the pressed area Ar1, the gradient of the tangent becomes close to 0 for the first time, that is, nearly parallel to the Y-axis.

After determining the pressed area Ars at step S14, the control unit 20 sets the second standard area Ar2 for receiving the second level input by adopting a result of addition of a predetermined addition width to the pressed area Ars (step S15). As clearly illustrated by a comparison of FIG. 4(A) and FIG. 4(B), even when the same addition width is added, the second standard area Ar2 set in this manner varies depending on the pressed area Ars at the point Ps when the operator maintains the pressure of the input.

Subsequently, the control unit 20 determines whether the area detection unit 40 has detected a pressed area satisfying the second standard area for receiving the second level input in accordance with increase in the pressed area of the pressing input by the operator (step S16).

The second standard area for receiving the second level input is a predetermined threshold of the pressed area set in the operation described above. If the area detection unit 40 detects a pressed area exceeding the threshold after the second standard area is set as described above, the control unit 20 processes accordingly to the reception of the second level input defined by the input apparatus 10.

If a pressed area satisfying the second standard area for receiving the second level input is not detected at step S16, the input apparatus 10 turns into the waiting state. On the other hand, if a pressed area satisfying the second standard area for receiving the second level input is detected at step S16, the control unit 20 controls the alert generation unit to generate a predetermined alert information (step S17). That is, the control unit 20 controls the vibration unit 50 to vibrate in a predetermined manner. Thereby, the operator may recognize upon generation of vibration that the second level input is normally received by the input apparatus 10. Making the alert information for the reception of the second level input different from that for the reception of the first level input enables the operator to easily distinguish between the input levels.

Along with the above operation, the control unit 20, in response to reception of the second level input, performs an operation corresponding to the second level input defined by the input apparatus 10 (step S18). For example, if the input apparatus 10 is applied to the shutter button of the camera, the process at step S18 corresponds to an operation of "full pressing" of the input apparatus 10, that is, an operation to release the shutter after appropriate operations of the functions for the AE and for the AF.

According to the present embodiment, as described above, the second standard area for receiving the second level input is set based on the pressed area after the first standard area is satisfied. It thus reduces a risk for even an operator who operates the input apparatus 10 for the first time to perform the "full pressing" at once not knowing a right adjustment. Also, even if used by a plurality of different operators, the input apparatus 10 sets the second standard area to be an appropriate pressed area by adopting the pressure of the input operation by each of the operators. Therefore, it is not necessary for each of the operators to adjust the operation to the pressed area required by the input apparatus 10.

Further, according to the input apparatus 10 of the present embodiment, the second standard area for receiving the second level input is not set unless the operator once maintains the pressure (that is, unless the pressed area Ars at the point Ps is determined). Therefore, the input apparatus 10 may have a sufficient time between start of the operation for the first level input to end of it, that is, before reception of the second level input. It is thus possible to prevent disadvantageous start of the operation for the second level input before the operation for the first level input is normally completed due to the "full pressing" at once by the operator.

(Second Embodiment)

Next, an input apparatus according to a second embodiment of the present invention will be described. The second embodiment of the present invention has a different manner to determine the pressed area Ars at step S14 described with reference to FIG. 3 in the above first embodiment. Other than that, the second embodiment may be substantialized in almost the same manner as the first embodiment. The input apparatus according to the second embodiment has the same configuration as the input apparatus 10 in the first embodiment but has different processing and operation by the control unit 20 (and the area change rate calculation unit 22). Hence, the same descriptions as those of the first embodiment set forth above will be omitted appropriately.

According to the input apparatus 10 of the second embodiment, the area change rate calculation unit 22 calculates the temporal change rate of the pushed area detected by the area detection unit 40, in the similar manner as the first embodiment. According to the second embodiment, however, the area change rate calculation unit 22 further calculates an average change rate of the pressed area between detection of the pressed area and detection of the pressed area satisfying the first standard area by the area detection unit 40. That is, in FIG. 4, the area change rate calculation unit 22 calculates the average change rate of the pressed area between the point P0 at which the area detection unit 40 detects the pressed area Ar0 of the pressing input by the operator and the point P1 at which the pushed area reaches the first standard area Ar1 as the operator increases the pressure of the input. This operation is performed at step S11 in FIG. 3.

Subsequently, the alert information is generated at step S12, whereby the operator may recognize that the input reception operation of the first level input is performed at step S13 and thus intends to maintain the pressure of the input (that is, suppresses increasing the pressure).

According to the second embodiment, after the area detection unit 40 detects the pressed area satisfying the first standard area Ar1 (i.e., after the point P1), the area change rate calculation unit 22 calculates the change rate in a predetermined period. This "predetermined period" is set to be 0.1 second, for example, which is suitably set for the area change rate calculation unit 22 to calculate the temporal change rate of the pressure. Around the point Ps at which the operator attempts to maintain the pressure of the input, the change rate of the pressed area in the above predetermined period calculated by the area change rate calculation unit 22 more rapidly decreases in comparison to the average change rate of the pressed area between the point P0 and the point P1.

At step S14 of the present embodiment, accordingly, the control unit 20 compares the change rate of the pressed area while decreasing in the above predetermined period and the average change rate calculated by the area change rate calculation unit 22. The control unit 20 determines the pressed area Ars by adopting the pressed area when the change rate of the pressed area in the above predetermined period decreases to be lower than the above average change rate by a predetermined value or more as a result of the comparison. That is, as illustrated in FIG. 4 of the present embodiment, the pushed area Ars is determined by adopting the pushed area at the point Ps when the gradient of the tangent of the curved line in a predetermined period after the point P1 decreases by a predetermined value or more in comparison to an average gradient of the curved line between the point P0 and the point P1.

According to the present embodiment, if the above "predetermined value" is set to be too small a value, a point even when the operator does not intend to maintain the pressure of the input is determined as the point Ps, and the pressed area at this point is determined as the pressed area Ars. Therefore, the "predetermined value" is preferably set to be a somewhat large value, avoiding a minimal value.

As described above, the present embodiment also suitably determines the pressed area Ars at the point Ps when the operator is assumedly maintaining the pressure of the input. It is thus possible to obtain the same effect as the first embodiment.

(Third Embodiment)

Next, an input apparatus according to a third embodiment of the present invention will be described. The third embodiment, in the similar manner as the second embodiment set forth above, has a different manner to determine the pressed area Ars at step S14 described with reference to FIG. 3 in the above first embodiment. The input apparatus according to the third embodiment has the same configuration as the input apparatus 10 in the first embodiment but has different processing and operation by the control unit 20 (and the area change rate calculation unit 22). Hence, the same descriptions as those of the above first and second embodiments will be omitted appropriately.

According to the input apparatus 10 of the third embodiment, the area change rate calculation unit 22, at predetermined intervals, calculates the temporal change rate of the pressed area detected by the area detection unit 40. The "predetermined intervals" may be arbitrary intervals such as every 0.2 second, for example, which enables detection of a significant change in the pressed area of the input by the operator by comparing the pressed area to that in an immediately prior period.

According to the third embodiment, at step S11 in FIG. 3, the area change rate calculation unit 22 calculates the change rate of the pressed area at the predetermined intervals after the area detection unit 40 detects the pressed area satisfying the first standard area Ar1 (i.e., after the point P1). Around the point Ps at which the operator starts maintaining the pressure of the input, the change rate of the pressed area in the predetermined interval calculated by the area change rate calculation unit 22 rapidly decreases in comparison to the change rate of the pressed area in the immediately prior interval.

At step S14 of the present embodiment, accordingly, the control unit 20 compares the change rate of the pressed area in a first predetermined period and that in a second predetermined period immediately prior to the first predetermined period, both of which are calculated by the area change rate calculation unit 22. As a result of the comparison, the control unit 20 determines the pressed area Ars by adopting the pressed area when the change rate in the first predetermined period decreases to be lower than the change rate in the second predetermined period by a predetermined value or more. As illustrated in FIG. 4 of the present embodiment, that is, the pressed area Ars is determined by adopting the pressed area at the point Ps when the gradient of the tangent of the curved line in the predetermined period after the point P1 decreases by more than the predetermined value in comparison to that in the predetermined period immediately prior thereto.

According to the present embodiment, if the "predetermined value" is set to be too small a value, a point even when the operator does not intend to maintain the pressure of the input is determined as the point Ps, and the pressed area at this point is determined as the pressed area Ars. Therefore, the "predetermined value" is set to be a somewhat large value, avoiding a minimal value.

As described above, the present embodiment also suitably determines the pressed area Ars at the point Ps when the operator is assumedly maintaining the pressure of the input. It is thus possible to obtain the same effect as the first and second embodiments.

(Fourth Embodiment)

Next, an input apparatus according to a fourth embodiment of the present invention will be described. According to the first, second and third embodiments described above, as illustrated in FIG. 4, the pressed area for receiving the second level input is set based on the pressed area Ars at the point Ps when the operator starts maintaining the pressure after the area detection unit 40 detects the pressed area satisfying the first standard area Ar1 (i.e., after P1). According to the fourth embodiment, as illustrated in FIG. 5, a second standard area Ar2' for receiving the second level input is set based on a pushed area Ars' at a point Ps' when the operator again increases the pressure of the input after maintaining it after the point Ps. Other than that, the input apparatus according to the fourth embodiment may be substantialized in almost the same manner as the first, second and third embodiments. The input apparatus according to the present embodiment has the same configuration as the input apparatus 10 described in the first, second and third embodiments but has different processing and operation by the control unit 20 (and the area change rate calculation unit 22). Hence, the same descriptions as those of the above embodiments will be omitted appropriately.

As illustrated in FIG. 5(A), there may be a case that, after the operator recognizes the reception of the first level input at the point P1, the pressed area thereafter is varied against the operator's intention to maintain it from the point Ps. This is because, since the pressure to the input apparatus 10 is maintained by the "halfway pressing", the actual pressure may be gradually reduced even if the operator intends to maintain a constant pressure.

The graph of the pressed area illustrated in FIG. 5(A) represents a state that, despite the operator's intention to maintain the pressure of the input from the point Ps, the pressure is gradually reduced and thus the pressed area detected by the area detection unit 40 is slowly decreased. In FIG. 5(A), a "fluctuation range" indicates the pressed area reduced (although unintended by the operator) between the point Ps when the operator maintains the pressure of the input and recognizes that the first level input is received and the point Ps' when the operator starts increasing the pressure once again.

On the other hand, as illustrated in FIG. 5(B), there also may be a case that the pressed area is gradually increased, although the operator intends to maintain the pressure of the input from the point Ps after recognizing that the first level input is received at the point P1. This is because the actual input pressure may be gradually increased in spite of that the operator intends to maintain a constant pressure.

The graph of the pressed area illustrated in FIG. 5(B) represents a state that, although the operator intends to maintain the pressure of the input from the point Ps, the pressure is gradually increased, and the pressed area detected by the area detection unit 40 is gradually increased. In FIG. 5(B), the "fluctuation range" indicates the pressed area increased (although unintended by the operator) between the point Ps when the operator maintains the pressure of the input and recognizes that the first level input is received and the point Ps' when the operator increases the pressure once again.

If the pressure is unintentionally reduced (or increased) by degrees as described above, it is assumed that the operator is intending to maintain a constant pressure. In such a case, therefore, if the second standard area for receiving the second level input is set based on the pressed area Ars at the point Ps when the operator starts maintaining the pressure, the operator may feel the second standard area unexpectedly heavy (or light).

That is, if the second standard area for receiving the second level input is set based on the pressed area Ars at the point Ps in FIG. 5(A), for example, the operator would feel heavy to carry out the pressing input with the pressed area satisfying the second standard area, as the actual pressure applied by the operator thereafter is somewhat reduced. On the other hand, if the second standard area for receiving the second level input is set based on the pressed area Ars at the point Ps in FIG. 5(B), the operator would feel light to carry out the pressing input with the pressed area satisfying the second standard area, as the actual pressure by the operator thereafter is somewhat increased. In the latter case, the pressure being gradually increased may reach the second standard area set based on the pressed area Ars, causing the reception of the second level input against the operator's intention.

According to the present embodiment, therefore, the second standard area Ar2' for receiving the second level input is determined based on the pressed area Ars' at the point Ps' when the operator again increases the pressure, instead of the pressed area Ars at the point Ps when the operator starts maintaining the pressure.

According to the input apparatus 10 of the fourth embodiment, the area change rate calculation unit 22 calculates the temporal change rate of the pressed area detected by the area detection unit 40. Accordingly, the control unit 20 sets the point Ps' at which the pressed area starts being increased after the point Ps at which the operator starts maintaining the pressed area, based on the change rate of the pressed area calculated by the area change rate calculation unit 22 after the area detection unit 40 detects the pressed area satisfying the first standard area Ar1.

That is, the control unit 20 sets the second standard area Ars2' based on the pressed area Ars' at a point (Ps') when the change rate of the pressed area calculated by the area change rate calculation unit 22, which previously decreases down to a first predetermined value or lower at the point Ps, increases exceeding a second predetermined value. Here, the "first predetermined value" is set based on the same technical idea as the "predetermined value" described in the first embodiment when the change rate of the pressed area decreases down to the predetermined value or lower. Also, the "second predetermined value" is a suitably large value to be clearly distinguishable from the change rate of the pressed area gradually increased between the point Ps and the point Ps' illustrated in FIG. 5(B), for example, such that the point Ps' is determined appropriately, at which the operator again increases the pressure and the pressed area is rapidly changed.

Figure 6:
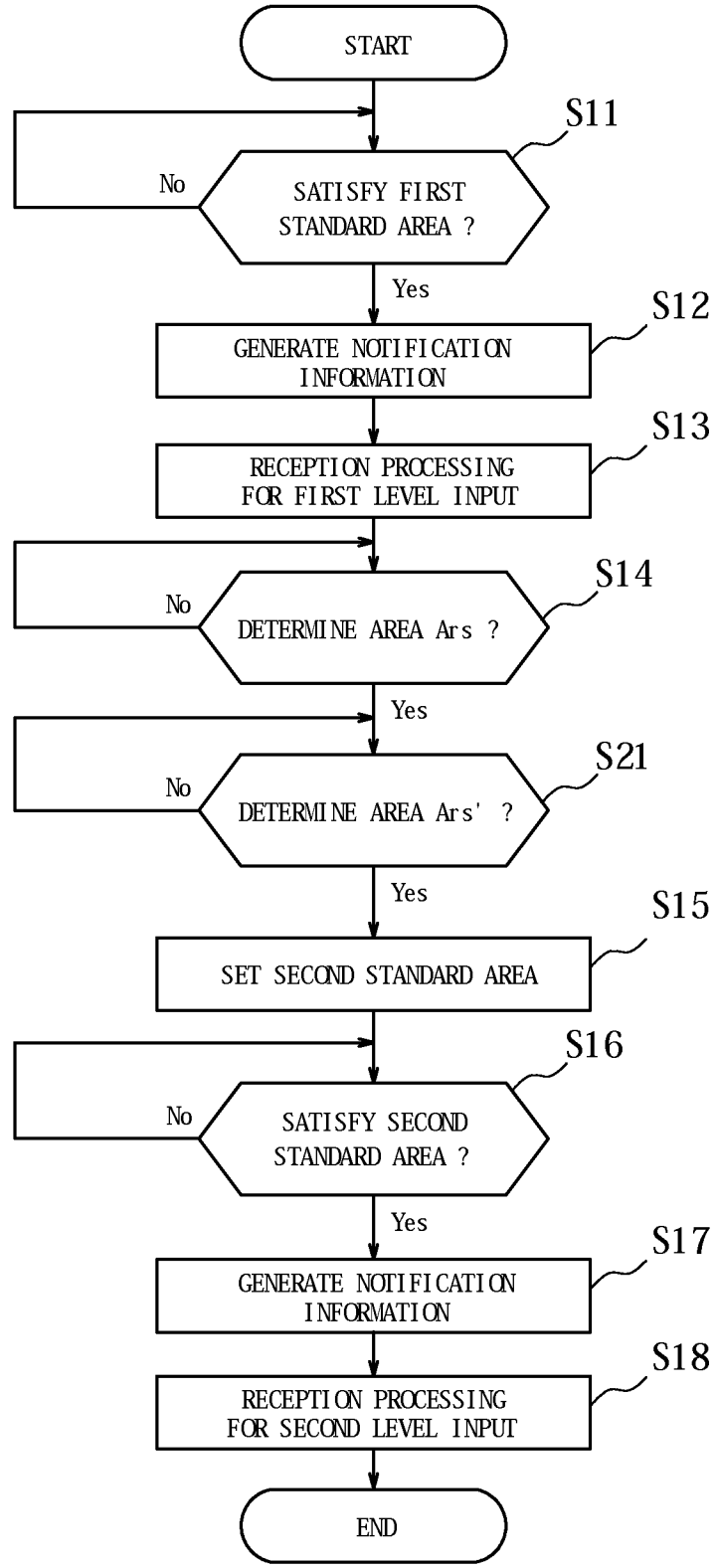
FIG. 6 is a flowchart illustrating an input reception operation by the input apparatus according to the present embodiment.

Next, the input reception operation by the input apparatus 10 according to the present embodiment will be described. FIG. 6 is a flowchart illustrating the input reception operation by the input apparatus 10 according to the present embodiment. The flowchart illustrated in FIG. 6 is the same as the flowchart in FIG. 3 described in the first, second and third embodiments, except a new step S21 inserted between the step S14 and the step S15. That is, subsequent to the determination on the pressed area Ars at the point Ps when the operator starts maintaining the pressure of the input at step S14, the control unit 20 determines whether the pressed area Ars' is determined (step S21).

If the pressed area Ars' is not determined at step S21, the input apparatus 10 turns into the waiting state. On the other hand, if the pressed area Ars' is determined at step S21, the control unit 20 continues the operations of step S15 and thereafter. That is, if the pressed area Ars' is determined at step S21, the control unit 20 sets the second standard area P2' for receiving the second level input by adopting a result of addition of a predetermined addition width to the pressed area Ars' (step S15). Operations thereafter are the same as that described with reference to the flowchart in FIG. 3, thus descriptions thereof are omitted.

According to the present embodiment, as described above, the second standard area Ar2' for receiving the second level input is set based on the pressed area Ars' at the point Ps' when the pressure increases again. Accordingly, as illustrated in FIG. 5(A), for example, if the operator unintentionally reduces the pressure by degrees from the point Ps at which the operator starts maintaining the pressure, the second standard area Ar2' is set by adopting the result of addition of the original addition width to the pressed area Ars' at the point Ps' when the pressure increases again. Or, as illustrated in FIG. 5(B), if the operator unintentionally increases the pressure by degrees from the point Ps at which the operator starts maintaining the pressure, the input apparatus 10 sets the second standard area Ars' by adopting the result of the addition of the original addition width to the pressed area Ars' at the point Ps' when the pressure increases once again. In either case, accordingly, the second standard area Ar2' for receiving the second level input is set based on the actual pressure varied despite the operator's intention to maintain it from the point Ps. It thus prevents the operator from feeling an input satisfying the second standard area for receiving the second level input unexpectedly heavy (or light) even if the operator fluctuates the pressure unintentionally. Accordingly, it is possible for the operator to operate without having a feeling of strangeness.

(Fifth Embodiment)

Next, an input apparatus according to a fifth embodiment of the present invention will be described. The input apparatus according to the fifth embodiment may be substantialized by the same configuration as the input apparatus 10 described in the fourth embodiment but has a different operation by the control unit 20 (and the area change rate calculation unit 22). Hence, the same descriptions as those of the above fourth embodiment will be omitted appropriately.

According to the fifth embodiment of the present invention, in the similar manner as the fourth embodiment, the second standard area Ar2' for receiving the second level input is determined based on the pressed area Ars' at the point Ps' at which the operator again increases the pressure. The fifth embodiment determines the pressed area Ars' in a different manner from the fourth embodiment. Here, according to the present embodiment, a method to determine the pressed area Ars' is altered in the same manner as the second embodiment altering the method to determine the pressed area Ars according to the first embodiment.

According to the input apparatus 10 of the fifth embodiment, the area change rate calculation unit 22 calculates the temporal change rate of the pressed area detected by the area detection unit 40, in the similar manner as the fourth embodiment. According to the fifth embodiment, however, the area change rate calculation unit 22 further calculates the average change rate of the pressed area between detection of the pressed area and detection of the pressed area satisfying the first standard area by the area detection unit 40. That is, in FIG. 5, the area change rate calculation unit 22 calculates the average change rate of the pressed area between the point P0 at which the area detection unit 40 detects the pressed area Art) of the pressing input by the operator and the point P1 at which the pressed area reaches the first standard area Ar1 as the operator increases the pressure of the input. This operation is carried out at step S11 in FIG. 6.

Subsequently, the alert information is generated at step S12 in FIG. 6, whereby the operator may recognize that the input reception operation of the first level input is performed at step S13 and thus starts maintaining the pressure of the input (that is, suppresses increasing the pressure).

According to the fifth embodiment, as described above, after detection of the pressed area satisfying the first standard area Ar1 by the area detection unit 40 (i.e., after P1), the area change rate calculation unit 22 calculates the change rate in a predetermined period. This "predetermined period" is set to be 0.1 second, for example, which is suitable for the area change rate calculation unit 22 to calculate the temporal change rate of the pressure. Around the point Ps when the operator starts maintaining the pressure of the input, the change rate of the pressed area in the above predetermined period calculated by the area change rate calculation unit 22 once rapidly decreases in comparison to the average change rate of the pressed area between the point P0 and the point P1.

At step S14 of the present embodiment, accordingly, the control unit 20 determines whether the change rate of the pressed area in the above predetermined period calculated by the area change rate calculation unit 22 decreases down to a first predetermined value or lower. At step S14 of the present embodiment, that is, the point Ps is defined as when the gradient of the tangent after the point P1 in FIG. 5 significantly decreases down to the first predetermined value or lower. Here, the "first predetermined value" when the change rate of the pressed area decreases down thereto or lower is set to be a small value close to 0, for example, based on the same technical idea as the "predetermined value" described in the first embodiment, such that the point Ps, at which the operator maintains the pressure by preventing it from increasing, may be identified.

When the point Ps at which the pressed area Ars is detected is determined at step S14, the control unit 20 determines the pressed area Ars' at the point Ps' when the change rate in the predetermined period calculated by the area change rate calculation unit 22 increases thereafter (step S21). According to the present embodiment, the control unit 20 compares the change rate of the pressed area in the above predetermined period and the average change rate of the pressed area calculated by the area change rate detection unit 22 in order to determine the point Ps'. Based on the comparison result, the control unit 20 determines the pressed area Ars' by adopting the pressed area at a point when a difference between the change rate of the pressed area in the above predetermined period and the average change rate becomes within a second predetermined value as a result of the comparison. According to the present embodiment, that is, the pressed area Ars' is determined by adopting the pressed area at the point Ps' in FIG. 5, when the gradient of the tangent of the curved line in the predetermined period from the point Ps increases such that a difference between it and the average gradient of the curved line from the point P0 to the point P1 becomes within the second predetermined value In other words, the pressed area Ars' is determined by adopting the pressed area at the point Ps' when the gradient of the tangent of the curved line in the predetermined period from the point Ps increases to become, for example, almost the same as the average gradient of the curved line from the point P0 to the point P1.

The "second predetermined value" according to the present embodiment is set to be a small value close to 0, for example, such that the Ps' is determined by adopting the point when the average change rate of the pressed area from the point P0 to the point P1 becomes substantially the same as the change rate in the predetermined period from the point Ps.

As described above, the present embodiment also suitably determines the pressed area Ars' at the point Ps' when it is assumed that the operator maintains the pressure of the input. It is thus possible to obtain the same effect as the fourth embodiment.

(Sixth Embodiment)

Next, an input apparatus according to a sixth embodiment of the present invention will be described. The input apparatus according to the sixth embodiment may be substantialized by the same configuration as the input apparatus 10 described in the fourth and fifth embodiments but has a different operation by the control unit 20 (and the area change rate calculation unit 22). Hence, the same descriptions as the above fourth and fifth embodiments will be omitted appropriately.

According to the sixth embodiment, in the similar manner as the fourth and fifth embodiments set forth above, the second standard area P2' for receiving the second level input is determined based on the pressed area Ars' at the point Ps' when the operator once again increases the pressure. The sixth embodiment also has a method to determine the pressed area Ars' different from the method of the fourth embodiment. Here, according to the present embodiment, the method to determine the pressed area Ars' is altered in the similar manner as the third embodiment altering the method of the first embodiment to determine the pressed area Ars.

According to the input apparatus 10 of the sixth embodiment, the area change rate calculation unit 22, at predetermined intervals, calculates the temporal change rate of the pressed area detected by the area detection unit 40. This "predetermined intervals", in the similar manner as the "predetermined intervals" described in the third embodiment, may be set suitably to be such as every 0.2 second, for example, which enables detection of a significant change in the pressed area of the input by the operator by comparing the pressed area to that in a period immediately prior thereto.

At step S11 in FIG. 6 according to the sixth embodiment, the area change rate calculation unit 22 calculates the change rate of the pressed area at the predetermined intervals after the area detection unit 40 detects the pressed area satisfying the first standard area Ar1 (i.e., after P1). Around the point Ps at which the operator starts maintaining the pressure of the input, the change rate of the pressed area in the predetermined interval calculated by the area change rate calculation unit 22 rapidly decreases in comparison to the area change rate in the interval immediately prior thereto.

Therefore, at step S14 of the present embodiment also, in the similar manner as the fifth embodiment, the control unit 20 determines whether the change rate of the pressed area in the above predetermined interval calculated by the area change rate calculation unit 22 decreases down to the first predetermined value or lower. That is, at step S14, the point Ps when the gradient of the curved line at the point P1 and thereafter in FIG. 5 decreases down to the first predetermined value or lower is determined Here, this "first predetermined value" is a small value close to 0, for example, in the similar manner as the fifth embodiment, such that the point Ps, at which the operator maintains the pressure by preventing it from increasing, may be identified.

When the point Ps at which the pressed area Ars is detected is determined at step S14, the control unit 20 compares the change rate of the pressed area in the first predetermined period and the change rate of the pressed area in the second predetermined period immediately prior to the first predetermined period, both of which are calculated by the area change rate calculation unit 22. As a result of the comparison, the control unit 20 determines the pressed area Ars' by adopting the pressed area when the change rate in the first predetermined period increases by the second predetermined value or more in comparison to the change rate of the pressed area in the second predetermined period as a result of the comparison (step S21). According to the present embodiment, that is, the pressed area Ars' in FIG. 5 is determined by adopting the pressed area at the point Ps' when the gradient of the tangent of the curved line in the predetermined interval from the point P1 is increased exceeding the second predetermined value in comparison to the gradient of the tangent of the curved line in the predetermined interval immediately prior thereto.

According to the present embodiment, if the above "second predetermined value" is set to be too small a value, a point when the pressed area subtly varies may be determined as the point Ps' and the pressed area Ars' is determined based on the pressed area at this point. In this case, the second standard area P2' for receiving the second level input is automatically set, although the operator intends to maintain the pressure of the input. Therefore, the "second predetermined value" is preferably set to be a somewhat large value, avoiding a minimal value.

As describe above, the present embodiment also suitably determines the pressed area Ars' at the point Ps' when it is assumed that the operator maintains the pressure of the input. Therefore, it is possible to obtain the same effect as the fourth and fifth embodiments.

(Seventh Embodiment)

Next, an input apparatus according to a seventh embodiment of the present invention will be described. The input apparatus according to the seventh embodiment may be substantialized by the same configuration as the input apparatus 10 described in the fourth to sixth embodiments but has a different operation by the control unit 20 (and the area change rate calculation unit 22). Hence, the same descriptions as the above fourth to sixth embodiments will be omitted appropriately.

In the above fourth to sixth embodiments, even if the operator unintentionally reduces the pressure by degrees from the point Ps when the operator starts maintaining the pressure, the second standard area Ar2' is determined by adopting the result of addition of the original addition width to the pressed area Ars' at the point Ps' at which the operator again starts increasing the pressure. However, if the operator unintentionally reduces the pressure significantly from the point Ps at which the operator starts maintaining the pressure, setting the second standard area Ar2' by adding the original addition width to the pushed area Ars' at the point Ps' makes the second standard area Ar2' very small. As described above, if the second standard area Ar2' for receiving the second level input after reception of the first level input is too small, the second level input is possibly received unintentionally due to a subtle fluctuation of the pressure of the input by the operator.

Figure 7:
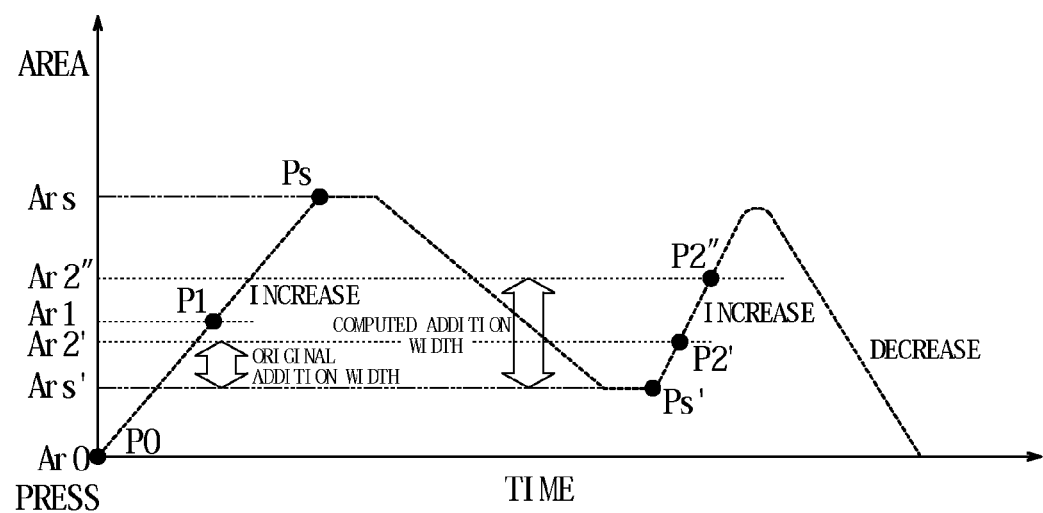
FIG. 7 is a graph illustrating changes in the pressed area detected by the area detection unit of the input apparatus according to a seventh embodiment.
Figure 8:
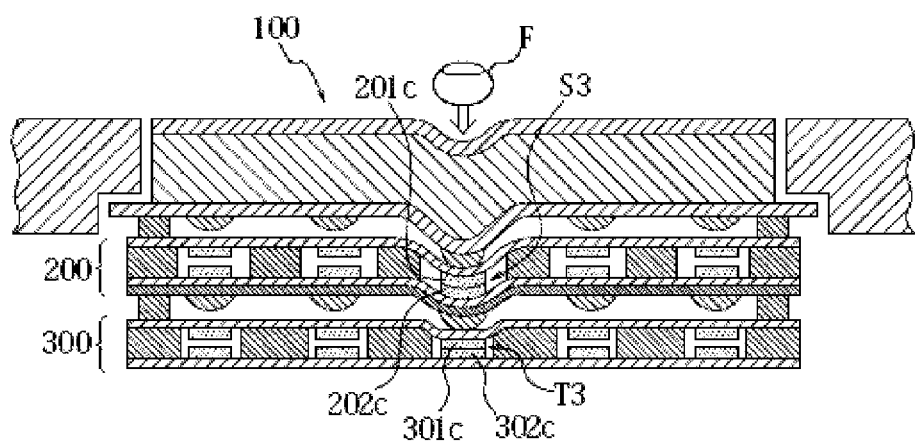
FIG. 8 is a cross-sectional view schematically illustrating an internal configuration of an operation apparatus according to a prior art.

According to the seventh embodiment, therefore, as illustrated in FIG. 7, if the pressed area Ars' at the point Ps' at which the operator again starts increasing the pressure is too small, a second standard area Ar2" is set by increasing the original addition width by an operation. For example, if the pressed area Ar2', obtained by adding the predetermined addition width to the pressed area Ars' at the point Ps', is smaller than the first standard area Ar1, the control unit 20 sets the second standard area Ar2" obtained by increasing the addition width such that the addition width exceeds the first standard area Ar1.

As described above, even if the operator significantly reduces the pressure after reception of the first input, the present embodiment prevents an unintended second input from being received due to the subtle fluctuation of the pressure of the input by the operator. According to the seventh embodiment, if the pressed area decreases too much after the point Ps, it may no longer be suitable as the "halfway pressing". In a case like that, if the pressed area decreases to a very small value close to 0, for example, after the first level input is once received, it is desirable to set a lower threshold to reset the first level input once received.

The input apparatus for receiving inputs of a plurality levels in accordance with the pressed area of the pressing inputs by the operator as described above may be used for various purposes in addition to the shutter button of the camera. For example, the input apparatus is applicable to a switch of water heaters or water supply equipment to adjust an amount of the hot/cold water to be supplied. That is, when the input apparatus is used as a hot water supply button or a cold water supply button, the operator may adjust the amount of the hot/cold water to be supplied in accordance with the pressed area on the button. For example, it is possible to supply a small amount of the hot/cold water in response to a light pressure and to supply an increased amount of the hot/cold water when the pressure of the input increases.

In addition, the input apparatus may be assigned a variety of operations, such as adjustment of an amount of the light or adjustment of power of a motor in accordance with the pressed area on the input apparatus.

Further, the input apparatus for receiving inputs of plurality of levels in accordance with the pressed area is also applicable to a button of an input device, such as a mouse. In this case, the "halfway pressing" of the button may be assigned an operation corresponding to a single click, whereas the "full pressing" of the button may be assigned an operation corresponding to a double click.

As described above, the input apparatus for receiving inputs of a plurality of levels in accordance with the pressed area is preferable for adjustment of an amount in accordance with the pressure or for assignment of stepwise operations in accordance with the pressure.

It is to be understood that the present invention is not limited to the embodiments set forth above but may be modified or varied in a multiple manner. For example, the vibration unit 50 vibrates to provide the operator with the alert information upon reception of an input at each level in each of the above embodiments. However, the alert information does not need to be vibration but may take any form, so long as capable of informing the operator that an input to the input apparatus 10 is normally received.

Accordingly, the input apparatus according to the present invention has the alert generation unit which allows the operator to recognize that the input is normally received by generating the alert information using at least one of sound, vibration and display. In detail, when the pressed area detected by the area detection unit 40 satisfies the first standard area, the control unit 20 controls the alert generation unit to generate the alert information. The same applies to the alert information when the second standard area is satisfied. The alert generation unit may be, instead of the vibration unit 50 as described above, the audio output unit 70 to generate predetermined sound or the display unit 32 or another display unit to display a visually recognizable display, such that the alert information is provided to the operator. As described above, making the alert information for reception of the first level input different from that for reception of the second level input enables the operator to easily distinguish between the input levels.

In addition, although the first standard area Ar1 for receiving the first level input is a predetermined fixed value in each of the above embodiments, the first standard area Ar1 may be variable. In this case, for example, the control unit 20 may store a history of the pressed area of usual pressing inputs by the operator detected by the area detection unit 40 in the memory unit 60 and set the first standard area Ar1 for receiving the first level input based on the history of the pressed area. In addition, it is preferable that the value of the first standard area Ar1 is not only predetermined but also suitably changeable or adjustable by the operator as necessary. Thereby, if the operator feels uncomfortable with the first standard area Ar1 in operation, he/she may change setting appropriately.

In the above descriptions, the value of the standard area is regarded as "the threshold of the pressed area", and it is determined that "the standard area is satisfied" when the pressed area reaches the value of the standard area. However, a condition to enable a determination that "the standard area is satisfied" is not limited to the above condition but may include multiple conditions. For example, it is also possible to determine that "the standard area is satisfied" when the pressed area of the pressing input to the input apparatus 10 by the operator exceeds the value of the standard area. In addition, it is also possible to determine that "the standard area is satisfied" when the pressed area indicating the value of the standard area is detected by the area detection unit 40.

Further, technical concepts termed by, for example, "a predetermined value or more" and "a predetermined value or less" do not necessarily mean the strict sense of the words but may be either inclusive of or exclusive of a criterial value, depending on a specification of the input apparatus. For example, "the predetermined value or more" may include a value increasing and reaching the predetermined value, and also include a value exceeding the predetermine value. Similarly, "the predetermined value or less" may include, for example, a value decreasing and reaching the predetermined value, and also include a value smaller than the predetermined value, that is, a value under the predetermined value.

As described above, the second standard area P2 for receiving the second level input is set every time the first level input is received according to the present embodiment. That is, the second level input is received when, before reception of a new first level input, the pressed area detected by the area detection unit 40 satisfies the second standard area P2 for receiving the second level input. Thereby, setting of the second standard area P2 for receiving the second level input in a previous operation is not maintained. Accordingly, an erroneous operation to receive the second level input (operation unintended by the operator) is prevented even when the operator applies the pressure at once.

Further, although the pressed area is used as a standard to receive an input at each level according to the embodiments of the present invention, the object of the present invention may be achieved also by using surface charge generated in pressing input as the standard. In this case, only the standard to receive the input at each level is changed and thus the input apparatus may be implemented by the same configuration as the input apparatus 10 described in each of the embodiments. The surface charge has a character such that it is generated when the fingertip of the operator and the touch panel 30 come close to one another or contact (press) with each other and increased in proportion to the contact dimension. As described above, since the surface charge is generated even when operator's fingertip and the touch panel 30 merely come close to one another, it is possible to deal with when they do not contact with each other, and thus applicable to various apparatus.

REFERENCE SIGNS LIST 10 input apparatus
20 control unit
22 area change rate calculation unit
30 touch panel
32 display unit
34 input unit
40 area detection unit
50 vibration unit
60 memory unit
70 audio output unit

The invention claimed is:

1. An input apparatus configured to receive inputs at a plurality of levels in accordance with a pressed area, comprising:
   an area detection unit configured to detect the pressed area of a pressing input; and
   a control unit configured to set, when the area detection unit detects the pressed area satisfying a first standard area for receiving a first level input,
   a second standard area for receiving a second level input.

2. The input apparatus according to claim 1, wherein the control unit sets the second standard area for receiving the second level input based on the pressed area detected by the area detection unit after the first standard area is satisfied.

3. The input apparatus according to claim 1 or 2, further comprising an
   area change rate calculation unit configured to calculate a temporal change rate of the pressed area detected by the area detection unit, wherein
   the control unit sets the second standard area based on the pressed area at the point when the change rate of the pressed area decreases to a predetermined value or lower for the first time after the area detection unit detects the pressed area satisfying the first standard area.

4. The input apparatus according to claim 1 or 2, further comprising an area change rate calculation unit configured to calculate an average change rate of the pressed area between detection of the pressed area and detection of the pressed area satisfying the first standard area by the area detection unit, and to calculate the temporal change rate of the pressed area detected by the area detection unit, wherein
   the control unit sets the second standard area based on the pressed area at a point when the change rate of the pressed area in a predetermined period after detection of the pressed area satisfying the first standard area by the area detection unit decreases to be lower than the average change rate by a predetermined amount or more.

5. The input apparatus according to claim 1 or 2, further comprising an area change rate calculation unit configured to, at a predetermined interval, calculate the temporal change rate of the pressed area detected by the area detection unit, wherein
   the control unit sets the second standard area based on the pressed area at a point when the change rate of the pressed area in a first predetermined period after detection of the pressed area satisfying the first standard area by the area detection unit decreases to be lower by a predetermined value or more than the change rate of the pressed area in a second predetermined period immediately prior to the first predetermined period.

6. The input apparatus according to claim 1 or 2, further comprising an area change rate calculation unit configured to calculate the temporal change rate of the pressed area detected by the area detection unit, wherein
   the control unit sets the second standard area based on the pressed area at a point when the change rate of the pressed area after detection of the pressed area satisfying the first standard area by the area detection unit, after decreasing
   to a first predetermined value or lower,
   increases to a second predetermined value or higher.

7. The input apparatus according to claim 1 or 2, further comprising an area change rate calculation unit configured to calculate the average change rate of the pressed area between detection of the pressed area and detection of the pressed area satisfying the first standard area by the area detection unit, and to calculate the temporal change rate of the pressed area detected by the area detection unit, wherein
   the control unit sets the second standard area based on the pressed area at a point when the change rate of the pressed area in a predetermined period after detection of the pressed area satisfying the first standard area by the area detection unit increases,
   after decreasing down to a first predetermined value or lower,
   to be different from the average change rate by a second predetermined value or less.

8. The input apparatus according to claim 1 or 2, further comprising an area change rate calculation unit configured to, at predetermined intervals, calculate the temporal change rate of the pressed area detected by the area detection unit, wherein
   the control unit sets the second standard area based on the pressed area at a point when the change rate of the pressed area in a
   first predetermined period after detection of the pressed area satisfying the first standard area by the area detection unit, after decreasing to a first predetermined value or lower, increases by a
   second predetermined value or more than the change rate of the pressed area in a
   second predetermined period immediately prior to the first predetermined period.

9. The input apparatus according to any one of claims 1 to 2, further comprising an alert generation unit configured to generate alert by using at least one of sound, vibration and display, wherein the control unit controls the alert generation unit to generate the alert when the pressed area detected by the area detection unit satisfies the first standard area.

10. An input method using an input apparatus configured to receive inputs at a plurality of levels in accordance with pressed area, comprising:
   an area detection step for detecting the pressed area of a pressing input; and
   a step for controlling to set, when the pressed area satisfying a first standard area for receiving a first level input is detected at the area detection step, a second standard area for receiving a second level input.

* * * * *